(12) United States Patent
Lee et al.

(10) Patent No.: US 10,016,946 B2
(45) Date of Patent: Jul. 10, 2018

(54) WEAVING METHOD AND APPARATUS FOR PERFORMING THE SAME

(71) Applicant: Hyundai Motor Company, Seoul (KR)

(72) Inventors: Jong Kook Lee, Gyeonggi-do (KR); Hyun Min Kang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 675 days.

(21) Appl. No.: 14/476,417

(22) Filed: Sep. 3, 2014

(65) Prior Publication Data

US 2015/0174830 A1 Jun. 25, 2015

(30) Foreign Application Priority Data

Dec. 19, 2013 (KR) .................. 10-2013-0159095

(51) Int. Cl.
| | |
|---|---|
| *B29C 70/24* | (2006.01) |
| *B65D 25/14* | (2006.01) |
| *B65D 81/18* | (2006.01) |
| *B29C 53/56* | (2006.01) |
| *B29C 53/72* | (2006.01) |
| *B29C 70/32* | (2006.01) |
| *B29K 105/10* | (2006.01) |
| *B29L 22/00* | (2006.01) |
| *B29L 31/00* | (2006.01) |

(52) U.S. Cl.
CPC .............. *B29C 70/24* (2013.01); *B29C 53/56* (2013.01); *B29C 53/72* (2013.01); *B29C 70/326* (2013.01); *B65D 25/14* (2013.01); *B65D 81/18* (2013.01); *B29K 2105/10* (2013.01); *B29L 2022/00* (2013.01); *B29L 2031/7156* (2013.01)

(58) Field of Classification Search
CPC ......... F02B 77/11; D21H 13/10; D21H 13/16; D21H 13/38; D21H 13/40; D21H 17/37; D21H 13/36; H01B 3/52; F01N 2260/20; B29C 70/24; B29C 70/326; B29C 53/72; B29C 53/56; B65D 81/18; B65D 25/14; B29L 2031/7156; B29L 2022/00; B29K 2105/10

See application file for complete search history.

(56) References Cited

U.S. PATENT DOCUMENTS

| | | |
|---|---|---|
| 5,252,158 A | 10/1993 | Shimizu et al. |
| 6,179,945 B1 | 1/2001 | Greenwood et al. |
| 6,601,793 B2 | 8/2003 | Yasui et al. |
| 6,655,707 B2 | 12/2003 | Buckmiller et al. |
| 8,105,454 B2 | 1/2012 | Uozumi et al. |
| 8,424,793 B2 | 4/2013 | Aiyama |
| 2001/0051484 A1 | 12/2001 | Ishida et al. |

FOREIGN PATENT DOCUMENTS

| | | |
|---|---|---|
| JP | 2001-288667 A | 10/2001 |
| KR | 20-0260606 Y1 | 12/2001 |
| WO | 92/21509 A1 | 12/1992 |

*Primary Examiner* — Robert J Grun

(74) *Attorney, Agent, or Firm* — Mintz Levin Cohn Ferris Glovsky and Popeo, P.C.; Peter F. Corless

(57) ABSTRACT

Disclosed are a method of spinning a continuous fiber without a mandrel to manufacture a hollow cylinder part and an apparatus for manufacturing the hollow cylinder part using the same method.

13 Claims, 3 Drawing Sheets

WEAVING METHOD AND APPARATUS FOR PERFORMING THE SAME

CROSS-REFERENCE TO RELATED APPLICATION

This application claims under 35 U.S.C. § 119(a) the benefit of Korean Patent Application No. 10-2013-0159095 filed on Dec. 19, 2013, the entire contents of which are incorporated herein by reference.

TECHNICAL FIELD

The present invention relates to a method of spinning continuous fibers without a mandrel to manufacture hollow cylinder parts and an apparatus for manufacturing the hollow cylinder parts using the same method.

BACKGROUND

A filament winding method has been actively developed as of a weaving technology of fibers. Generally, the filament winding is a method of forming a composite by winding a continuous fiber, which is impregnated with resin, around a mandrel having a preset shape followed by hardening process. Since this method may require the use of the mandrel having a preset shape, manufacturing costs may increase, productivity may be reduced, and weight of the final products may increase.

In FIG. 1, a conventional filament winding device in the related technologies is shown.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to solve the above-described problems in the conventional filament winding. Accordingly, the present invention provides a novel weaving method using a centrifugal force and an apparatus for performing the same.

In one aspect of the present invention, a method of weaving a fiber impregnated with resin to manufacture a three-dimensional hollow fiber structure is provided.

In an exemplary embodiment, the fiber impregnated with resin may be spun within a mold and disposed on an internal surface of the mold; a spinning unit spinning the fiber may move along and rotate about a traveling shaft within the mold; and the fiber may be spun in the circumferential direction by a centrifugal force. Accordingly, the three-dimensional fiber structure may be weaved according to the internal shape of the mold. The mold suitably may be substantially hollow. Particularly, the weaving method may use a centrifugal force.

In another aspect of the present invention, the apparatus for manufacturing the substantially hollow fiber structure is provided. In particular, the apparatus may not include a mandrel. Consequently, manufacturing costs may be reduced, and productivity of a linerless product having a shape may increase. Furthermore, the final product may be implemented without the mandrel, thereby reducing the weight of product.

In other aspect of the present invention, disclosed is an article manufactured by the method described above. In an exemplary embodiment, a high-pressure tank may be manufactured by the above described method of weaving a fiber impregnated with resin.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
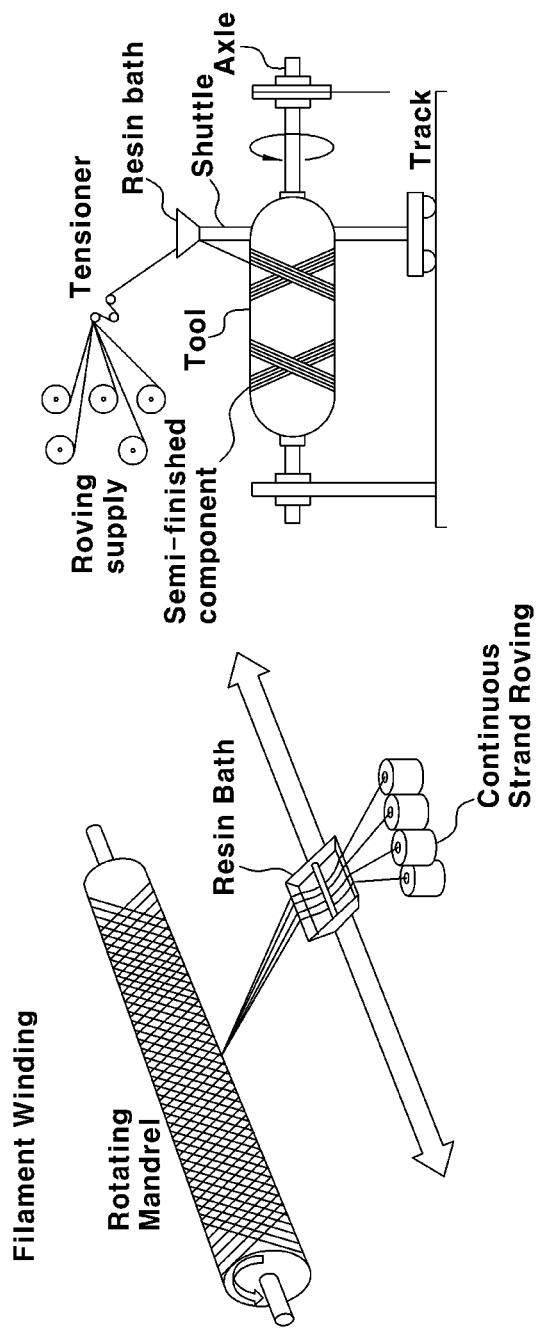
FIG. 1 is a schematic view illustrating an exemplary conventional filament winding apparatus and an exemplary process thereof.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. The detailed description of the invention will be provided for the purpose of explaining the principles of the invention and its practical application, thereby enabling others skilled in the art to understand the invention for various exemplary embodiments and with various modifications as are suited to the particular use contemplated. The detailed description is not intended to be exhaustive or to limit the invention to the precise embodiments disclosed. Modifications and equivalents will be apparent to practitioners skilled in this art and are encompassed within the spirit and scope of the appended claims.

In one aspect, the present invention provides a method of weaving a fiber impregnated with resin to manufacture a three-dimensional substantially hollow fiber structure.

In an exemplary embodiment, the fiber impregnated with resin may be spun within a mold and disposed on an internal surface of the mold; a spinning unit spinning the fiber may move along and rotate about a traveling shaft within the mold; and the fiber may be spun in the circumferential direction by a centrifugal force. Therefore, the three-dimensional fiber structure may be weaved along the internal shape of the mold. In particular, the method may not include a mandrel.

During the circumferential spinning, an angular velocity may be accelerated until the spun fiber arrives at an inner wall of the mold, and a nozzle where the spinning unit spins the fiber may be tilted.

A shape and a density of the hollow fiber structure may be determined by a tilting angle of a nozzle wherein the spinning unit spins the fiber, a velocity of the spinning unit, and an inner shape of the mold. Further, a weaving thickness of the hollow fiber structure may be adjusted as the spinning unit moves forward and backward repeatedly.

In an exemplary embodiment, the method may further include pressing the weaved fiber structure into the mold, heat-curing, ultraviolet-curing, or dehydrating the weaved fiber structure after separation from the mold.

Figure 3:
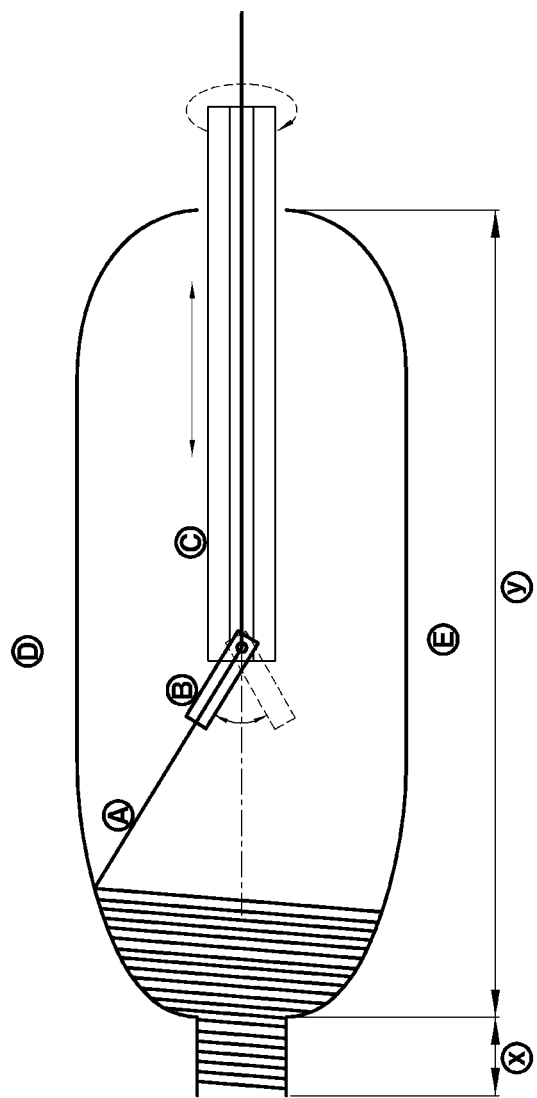
FIG. 3 is a schematic view illustrating an exemplary apparatus for manufacturing a hollow fiber structure with a weaved continuous fiber impregnated with resin according to an exemplary embodiment of the present invention.

In another aspect, as illustrated in FIG. 3, the present invention provides an apparatus for manufacturing a hollow fiber structure as a weaved fiber impregnated with resin.

In an exemplary embodiment, the apparatus may include: a nozzle spinning the fiber; a spinning unit which is coupled with the nozzle and has a hollow central portion; and an upper mold and a lower mold for manufacturing hollow parts.

In FIG. 3, a fiber A may be used in braiding or a filament winding and impregnated with a resin prior to a step of spinning by the nozzle B. The nozzle B may be coupled with the spinning unit C with a degree of freedom of a first level or a second level, and tilted to one side or the other of the end of the traveling shaft. The spinning unit C coupled with the nozzle B may move forward and backward, rotate about a central shaft, and allow the fiber to move toward the nozzle B through the hollow central portion. An upper mold D and a lower mold E may be for manufacturing hollow parts. Accordingly, the fiber spun from the nozzle may be B wound or weaved along inner shapes of the inner surfaces formed of the upper mold D and the lower mold E.

In FIG. 3, "x" indicates a section where a trajectory of an early spinning fiber is stabilized. The fiber may be spun as a designed shaped part from a section "y."

An angular velocity of the fiber spun by the rotation of the spinning unit C may be accelerated until the spinning fiber arrives at the inner wall of the molds.

A shape and a density of the hollow fiber structure may be determined by a tilting angle of a nozzle B when the spinning unit C spins the fiber a velocity of the spinning unit, and an inner shape of the mold. In addition, a weaving thickness of the hollow fiber structure may be adjusted when the spinning unit C moves forward and backward repeatedly.

In particular, the apparatus may not include a mandrel. In the related art, the conventional filament winding has been widely used to manufacture a high strength structure using a continuous fiber reinforced polymer composite as shown in FIG. 1. However, since a desired shape is manufactured with a mandrel and the continuous fiber wind around the mandrel, the manufacturing costs may increase, productivity may be reduced, and the weight of the products may increase. Therefore, the present invention provides advantages over conventional method by manufacturing a continuous fiber reinforced polymer composite structure with a centrifugal force utilizing a fiber spinning without a mandrel.

Figure 2:
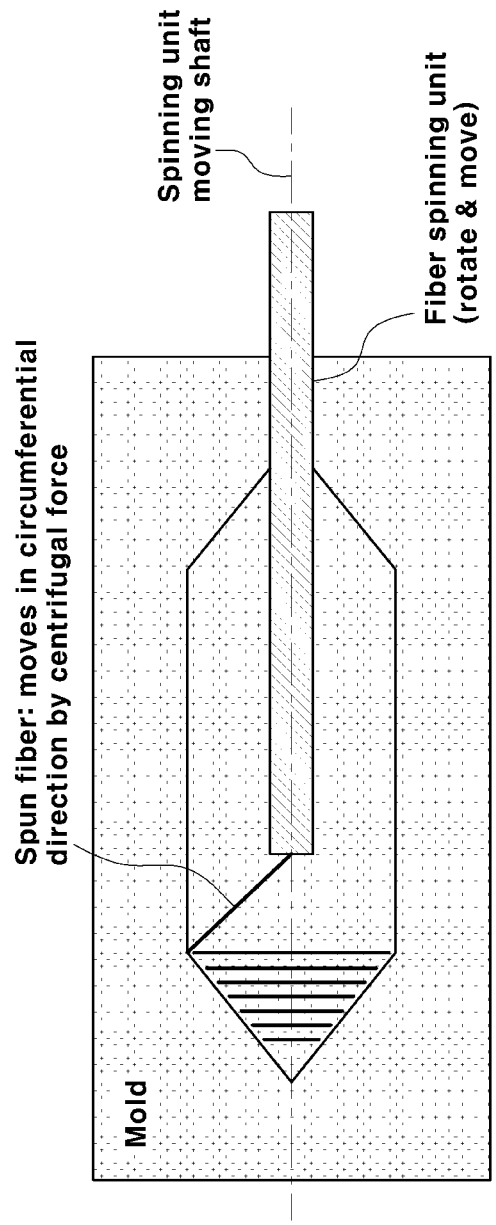
FIG. 2 is a schematic view illustrating an exemplary method of continuous weaving using a centrifugal force according to an exemplary embodiment of the present invention.

More particularly, during the spinning of a resin-impregnated fiber, the spinning unit may rotate to generate a centrifugal force of the fiber such that the resin-impregnated continuous fiber may be spun and disposed in the internal surface or inner wall of the mold as shown in FIG. 2. Thus, a high strength structure, for example, a hollow cylinder parts, may be manufactured without a mandrel using the continuous fiber. In addition, the method according to various exemplary embodiments of the present invention may be applied to every shape of fibers manufactured by the filament winding.

A fiber required to manufacture a product may be transferred through the spinning unit C and the nozzle B sequentially and be spun into a free space from an end of the nozzle B.

Typically, the spun fiber makes a parabolic motion and falls by gravity. However, according to exemplary embodiments of the present invention, when the spinning unit C rotates about the central shaft, the spun fiber may rotate about the same central shaft as the spinning unit C. The trajectory of the rotation may be determined by a length of the spun fiber, a rotating rate per minute of the spinning unit C, and a tilting angle of B. Thus, when an angular velocity faster than the spun fiber arrives at the inner wall of the mold, the fiber spun from the nozzle B may contact the inner wall of the mold.

The position in the inner wall of the mold where the fiber contacts may be adjusted as the spinning unit C moves forward and backward. Further, the movements of the nozzle B and the spinning unit C may be controlled overall so that the inner wall of the mold may be filled with the fiber spun from the nozzle B. Basically, the trajectory of the fiber may be determined by the movements of the nozzle B and the spinning unit C and the shape information of the mold. Accordingly, a spinning speed of the fiber and the functions for movements of B and C may be obtained based on the desired shape information of the mold.

For example, in manufacturing a high-pressure tank using the apparatus according to an exemplary embodiment of the present invention, the functions for movements of the nozzle B and the spinning unit C may be automatically programmed for the weaving and winding based on the high-pressure tank shape information of the mold at the beginning. Then, the apparatus may operate based on the program to manufacture the high-pressure tank.

Moreover, by moving the spinning unit C forward and backward repeatedly, thickness of a weaved or wound wall may be adjusted.

Furthermore, after the weaving or the winding, hardening may be performed by closing the mold and applying an internal pressure of air to the mold or hardening the weaved or wound product after separation of the mold, so that the final product may be manufactured.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of weaving a fiber impregnated with resin to manufacture a three-dimensional hollow fiber structure,
   wherein the fiber impregnated with resin is spun within a mold to seat on an internal surface of the mold,
   wherein a spinning unit spinning the fiber moves along and rotates about a traveling shaft within the mold,
   wherein the fiber is spun in the circumferential direction by a centrifugal force,
   wherein the three-dimensional fiber structure is weaved along the internal shape of the mold and
   wherein a nozzle is tilted to one side or the other of the end of said shaft.

2. The method of claim 1, wherein the method is performed without a mandrel.

3. The method of claim 1, wherein an angular velocity of the spinning unit is accelerated until the spun fiber arrives at an inner wall of the mold.

4. The method of claim 1, wherein a shape and a density of the hollow fiber structure are determined by a tilting angle of the nozzle when the spinning unit spins the fiber, and a velocity of the spinning unit.

5. The method of claim 1, wherein a weaving thickness of the hollow fiber structure is adjusted by moving the spinning unit forward and backward repeatedly.

6. The method of claim 1, further comprises pressing the weaved fiber structure into the mold, heat-curing, ultraviolet-curing, or dehydrating the weaved fiber structure after separation from the mold.

7. An apparatus for manufacturing a hollow fiber structure as a weaved fiber impregnated with resin, comprising: a nozzle spinning a fiber; a spinning unit coupled with the nozzle, wherein the spinning unit has a hollow central portion, moves forward and backward, rotates about a central shaft, and allows the fiber to move toward the nozzle through the hollow central portion; and an upper mold and a lower mold for manufacturing hollow parts, wherein the fiber spun from the nozzle is wound or weaved along inner shapes of the inner surfaces of the upper mold and the lower mold, wherein the fiber is impregnated with a resin prior to the spinning by the nozzle, and wherein the nozzle is coupled with the spinning unit with a degree of freedom of a first level or a second level, and tilted to one side or the other of the end of said shaft.

8. The apparatus of claim 7, wherein the apparatus comprises a first section where a trajectory of an early spinning fiber is stabilized and a second section where the fiber is spun as a designed shaped part.

9. The apparatus of claim 7, wherein an angular velocity of the fiber spun by the rotation of the spinning unit is accelerated until the spinning fiber arrives at an inner wall of the molds.

10. The apparatus of claim 7, wherein a shape and a density of the hollow fiber structure are determined by a tilting angle of the nozzle when the spinning unit spins the fiber, a velocity of the spinning unit, and an inner shape of the mold.

11. The apparatus of claim 7, wherein a weaving thickness of the hollow fiber structure is adjusted as the spinning unit C moves forward and backward repeatedly.

12. The apparatus of claim 7, wherein the apparatus does not comprise a mandrel.

13. A high-pressure tank manufactured by the method of weaving a fiber impregnated with resin of claim 1.

* * * * *